United States Patent [19]

Berke et al.

[11] Patent Number: 5,250,113
[45] Date of Patent: Oct. 5, 1993

[54] DRY CASTABLE CONCRETE COMPOSITIONS AND METHODS OF PREPARING AND DRY CASTING THE SAME

[75] Inventors: Neal S. Berke, Chelmsford, Mass.; Samuel F. Heleba, Issaquah, Wash.; Mario A. Tamez, Houston, Tex.

[73] Assignee: W. R. Grace & Co.-Conn., New York, N.Y.

[21] Appl. No.: 738,654

[22] Filed: Jul. 31, 1991

[51] Int. Cl.$^5$ .................. C04B 7/13; C04B 14/00; C04B 28/02
[52] U.S. Cl. .................. 106/737; 106/638; 106/719; 106/724; 106/738; 106/802; 106/817; 106/823; 524/2; 524/650
[58] Field of Search ............. 106/638, 697, 709, 713, 106/724, 737, 823, 802, 718, 719, 738, 708, 803, 811, 817; 524/2, 4, 6, 593, 650, 813, 840

[56] References Cited

U.S. PATENT DOCUMENTS

| | | | |
|---|---|---|---|
| 4,118,242 | 10/1978 | Kjohl et al. | 106/823 |
| 4,310,486 | 1/1982 | Cornwell et al. | 264/309 |
| 4,505,753 | 3/1985 | Scheetz et al. | 106/737 |
| 4,623,682 | 11/1986 | Nicholson et al. | 524/3 |
| 4,666,521 | 5/1987 | Colin | 106/737 |
| 4,673,659 | 6/1987 | Wood et al. | 106/737 |
| 4,746,364 | 5/1988 | Kawai et al. | 106/708 |
| 4,931,098 | 6/1990 | Danielssen et al. | 106/638 |

FOREIGN PATENT DOCUMENTS

| | | |
|---|---|---|
| 1190947 | 7/1985 | Canada . |
| 0246181 | 11/1987 | European Pat. Off. . |
| 1495811 | 12/1977 | United Kingdom . |
| 2131409A | 6/1984 | United Kingdom . |

OTHER PUBLICATIONS

Concrete Pipe Handbook, Published by: American Concrete Pipe Association; Apr., 1981; pp. 2-11 through 2-18.
Resistance of Microsilica Concrete to Steel Corrosion, Erosion, and Chemical Attack, by N. S. Berke; Proceedings of the Third International Conference on Silica Fume, Trondheim, Norway, 1989; vol. 2 ACI SP114-42 pp. 861-886.

Primary Examiner—Mark L. Bell
Assistant Examiner—Michael Marcheschi
Attorney, Agent, or Firm—John J. Wasatonic; William L. Baker

[57] ABSTRACT

Dry castable concrete compositions having improved strength and resistance to aggressive chemicals are provided. The compositions comprise water, hydraulic cement, fine and coarse aggregate, and condensed silica fume, wherein the weight ratio of condensed silica fume to hydraulic cement is about 0.10 to 0.25, the water to cement weight ratio is about 0.18 to 0.33, and the mix has a slump of about ½ inch or less. Also provided is a method of preparing the dry castable compositions using aqueous condensed silica fume slurries and a method of dry casting the compositions.

21 Claims, No Drawings

DRY CASTABLE CONCRETE COMPOSITIONS AND METHODS OF PREPARING AND DRY CASTING THE SAME

BACKGROUND OF THE INVENTION

This invention relates to dry castable concrete compositions, a method of preparing these compositions, and dry casting methods using these compositions. More particularly, this invention relates to dry castable concrete compositions containing condensed silica fume and casting these compositions to produce sewage pipe having improved strength and resistance to acids and other aggressive chemicals.

It is well known to produce sewage pipe and concrete pipe for general purposes by dry casting methods. These methods are so called because they use a dry concrete mix, i.e., one containing a relatively low amount of water and having a low slump. Ideally, the mix contains only that amount of water which is necessary for hydration of the cement and desired workability. The water to cement ratio is usually less than 0.30 and the slump is less than ½ inch, preferably zero or less.

There are four conventional dry casting methods used in the industry. These are commonly referred to as the packerhead, dry cast, tamp, and centrifugal or spinning methods. The following descriptions of these methods are extracted in part from the "Concrete Pipe Handbook", published by the American Concrete Pipe Association, Vienna, Va., 1981 ed., which is incorporated by reference herein:

1. Packerhead process—This process uses a stationary exterior form which is usually cylindrical. The dry concrete mix is fed into the form and, as it is introduced, a revolving disc or "packerhead", extended from a revolving shaft, is drawn upward through the form. The disc diameter determines the inside diameter of the pipe. The head has rollers or deflectors mounted on the top which compact the mix against the form. When compaction is complete, the form and pipe are moved to a curing area where the exterior form is removed.

2. Centrifugal or spinning process—"The centrifugal or spinning process uses an outer form that is rotated in a horizontal position during the pipe making process. Vibration and compaction can be used in combination with centrifugation to consolidate the concrete mix. While the mix is wetter than some pipe mixes, water is extracted from the concrete by the centrifugal forces which develop as the pipe is spinning. As the form is rotated, concrete is fed into the form by a conveyor system that is capable of distributing concrete throughout the form length. This finished pipe, still in the form, is moved to the curing area and cured in the form."

3. Dry cast Process—"The dry cast process has several variations but all use low frequency-high amplitude vibration to distribute and densely compact the dry mix in the form. The form is removed immediately as the newly formed pipe can support itself. To get the desired vibration at all points, several different techniques are utilized.

In one method, vibrators are usually attached directly to the exterior form. The mix is fed into the form and the vibrators are operated at various stages during this process. At the completion of the process, the pipe and form is lifted off the machine and moved to the curing area where the form is removed.

Another variation of the dry cast method has a central core that moves up and down and provides vibration and compaction. In this method, when the process is completed, the core retracts and the pipe is stripped and moved to the curing area."

4. Tamp process—"The tamp process uses direct mechanical compaction to consolidate the concrete mix. Inner and outer forms are placed on a rotating table, and the concrete mix is fed into the forms. As the form is rotated and filled the tamper rises automatically. There are usually multiple tampers so that the mix on each side of any reinforcement can be compacted. The pipe is removed from the machine with either the inner or outer form and moved to the curing area where the form is removed."

Although concrete is a preferred material for preparing sewage pipe, it has the disadvantage of being subject to attack by sulfuric acid and other chemicals in the sewage. The sulfuric acid can result from the oxidation of hydrogen sulfide which in turn results from the action of anaerobic sulfur-reducing bacteria. The sulfuric acid reacts with the alkaline cement, particularly the calcium hydroxide component, resulting in deterioration and cracking of the concrete.

It is an object of this invention to provide a method of producing concrete sewage pipe having improved chemical resistance, particularly to sulfuric acid attack.

It is another object of this invention to provide a method for producing chemically resistant concrete pipe by dry casting methods.

It is another object of this invention to provide a dry concrete mix which is suitable for use in preparing pipe by dry casting methods and after setting has improved strength and chemical resistance.

It is another object of this invention to provide a method for preparing the dry concrete mixes of the invention.

SUMMARY OF THE INVENTION

According to this invention, these and other objects are attained by the provision of dry concrete mixes, suitable for use in the dry casting of pipe and other concrete structures, which comprise specified levels of condensed silica fume. It has been found that the use of condensed silica fume in dry castable concrete mixes provides higher strength and increased resistance to acids and other aggressive chemicals in cast products prepared from the mixes. The dry concrete mixes of this invention accordingly comprise water, a hydraulic cement binder, and pozzolanic condensed silica fume, hereinafter "CSF", wherein the weight ratio of CSF to hydraulic cement binder, calculated as a dry weight, is about 0.10 to 0.25, the water to cement weight ratio is about 0.18 to 0.33, the mix having a slump of about ½ inch or less as measured by ASTM C-143. The concrete mixes, which further comprise appropriate amounts of coarse and fine aggregate, have been found to have the necessary rheology for the movement and placement of the concrete required by the dry casting methods and, furthermore, to have the requisite low slump and consistency which permit the early removal of the casting forms from the cast pipe, this being the conventional practice in dry casting production methods.

The present invention is further directed to a method of producing the dry concrete mixes. The method involves the use of aqueous condensed silica fume slurries which permit the maintenance of the required low water to cement ratio while providing the desired concentration of condensed silica fume. The method comprises providing a mix of hydraulic cement, coarse aggregate, and fine aggregate, each as defined hereinafter, and adding to the mix an aqueous slurry of condensed silica fume containing at least 5 pounds of CSF per gallon of slurry, the slurry being added in an amount which provides a CSF to cement weight ratio of about 0.10 to 0.25 and results in a water to cement weight ratio of about 0.18 to 0.33, based on the total amount of water in the concrete mix. The total water in the concrete mix may be provided solely by the CSF slurry addition. In the more usual situation, however, the aggregate, especially the fine aggregate, contains significant amounts of water. The total water in the mix is thus the sum of the CSF slurry water, the residual water in the aggregates, and any additional water which may be added.

The use of CSF in slurry form is a desired practice from the standpoint of transport and handling of CSF. Moreover, the addition of CSF in slurry form has been found to provide a superior dry concrete mix as compared to mixes prepared using densified CSF (the other common commercial form used in concrete). However, since the use of an aqueous slurry necessarily involves the addition of water to the mix, the provision of the CSF in the form of the specified high concentration slurry permits the preparation of a dry concrete mix, suitable for dry casting, having both the desired CSF concentration and low water to cement ratio.

In another aspect, the invention is directed to a method of producing cast concrete structures, such as concrete pipe, having improved compressive strength and chemical resistance. The method comprises shaping a dry concrete mix of the invention into the form of the structure, e.g., into the form of a pipe, by a dry casting method, removing the casting form (or mold) from the cast mix, and permitting the cast mix to cure. As is conventional in preparing such cast structures, the form is generally removed prior to complete curing of the cast concrete.

DETAILED DESCRIPTION OF THE INVENTION

The following definitions shall apply herein.

"Dry casting method" shall mean any of the dry cast, packerhead, tamp, or centrifugal dry casting methods described above, each of which is well known in the pipe casting industry.

"Condensed silica fume" (CSF) shall mean the condensed, particulate, amorphous silicon dioxide obtained as a by-product in the production of silicon metal, ferrosilicons, or other metals or metal alloys in electric reduction furnaces. For a detailed discussion of condensed silica fume, its production, chemical composition, and uses, reference is made to the brochure entitled "Condensed Silica Fume", published in 1983 by the University of Sherbrooke, Sherbrooke (Quebec) Canada, which is incorporated by reference herein.

Condensed silica fume slurries are well known as strength enhancing and permeability reducing additives for structural concrete. In addition, aqueous CSF slurries have been suggested for use as additives to improve the resistance of structural concrete to attack by sulfuric acid. However, structural concrete has a relatively high degree of fluidity, with a relatively high water content. Thus, the addition of water to the concrete via CSF slurry addition does not normally present a problem. If necessary, one can compensate for this added water by decreasing the normal amount of mix water used to prepare the fluid concrete mix. In contrast, dry castable concrete mixes have a very low fluidity and low water content, and these requirements place tight constraints on the ability to employ aqueous-based additive materials.

The present invention provides dry castable concrete mixes which contain CSF and may be prepared using aqueous CSF slurries. As previously noted, it has been found that cast products made from these mixes have improved strength and exhibit substantially improved resistance to aggressive chemicals, including sulfuric acid. These improved properties are attributable to the use of condensed silica fume in the concrete. The dry concrete mixes of the invention accordingly comprise water, a hydraulic cement, fine and coarse aggregate, and CSF, wherein the CSF to hydraulic cement ratio, based on dry solids, is about 0.10 to 0.25, the water to cement ratio is about 0.18 to 0.33, and the slump is about $\frac{1}{4}$ inch or less, as measured by the procedure of ASTM C-143. Preferably, the CSF/cement ratio is about 0.15 to 0.22, the w/c ratio is about 0.22 to 0.30, and the slump is zero or less.

The term "hydraulic cement" is used herein in its ordinary and well accepted sense, and thus refers to any cement which, when made into a paste with water, hardens as a result of chemical reactions between the water and cement. Portland cement is the most familiar example of a hydraulic cement and is the preferred material for use in the concrete compositions of this invention. ASTM C-150 Types I through V Portland cements may be used in this invention. The hydraulic cement component of the compositions can be solely Portland cement or a mixture of Portland cement and pozzolanic materials other than condensed silica fume, e.g., fly ash. When such cementitious mixtures are used, the water to cement ratios given herein are based on the combined weight of the cementitious materials, e.g., the combined weight of Portland cement and fly ash. Generally, the cement factor of the concretes of this invention is between 400 and 850 pounds per cubic yard, and preferably between 500 and 650 pounds per cubic yard. Cement factors are based solely on the Portland cement or other hydraulic cement content and do take into account pozzolanic materials such as fly ash.

The amount of coarse aggregate and fine aggregate which is used, and the ratio of one of the other, is that which provides desired strength and workability. Generally, the weight of each type of aggregate in the mix is about 2 to 4 times the weight of dry cement and the weight ratio of one aggregate to the other ranges from about 70:30 to 30:70, more preferably about 65:35 to 35:65. For purposes of this application, the arbitrary division between fine and coarse aggregate is about 3/16 inch diameter, the lower limit on fine aggregate is a size just passing the number 100 sieve, and the upper limit on coarse aggregate is about 1¼ inches.

In general, the fine aggregates used in commercial production have a significant water content, e.g., 3% to 6% by weight. Since dry castable concrete compositions generally contain substantial amounts of fine aggregate, the residual water content of the aggregate contributes substantially to the total water content of the concrete, thus tightening the aforementioned constraints on the use of aqueous based additives in these low water content mixes.

In large scale or continuous use applications, CSF cannot be practically used in its fine particulate form due to dust problems and problems in handling and dispensing the material. CSF has thus been made commercially available in two principal forms, a dry, particulate densified form and in the form of an aqueous slurry. It would seem that the densified form would be preferred in the mixes used in dry casting methods because its use would not involve the addition of water. Thus, the w/c ratio would be independent of the use of this material, allowing the operator to more easily maintain the desired low w/c ratio. However, applicants have found that densified CSF cannot be uniformly distributed int the dry mixes used in dry casting. Conversely, as part of this invention, applicants have found that if CSF is added in slurry form, uniform distribution of the additive in such dry mixes can be attained using conventional mixing eguipment. In addition, the present invention provides a means for using CSF slurries, whereby the CSF is provided in the dry mix at a concentration which provides desired resistance to chemical attack, while still permitting water to cement ratios which give low slump mixes that can be satisfactorily dry cast. This is accomplished through the use of an aqueous CSF slurry having a CSF concentration of at least about 5 pounds per gallon and adding the slurry to the mix at a dosage providing a CSF/cement ratio of about 0.10 to 0.25. Preferably the slurry has a CSF concentration of about 5.0 to 8.0 pounds per gallon. The more preferred CSF concentrations are at least about 6.0 pounds per gallon and the more preferred range is about 6.0 to 7.5 pounds per gallon. In general, this preparative method allows the use of desired amounts of coarse and fine aggregate, which contain residual water, without resulting in an unacceptably high w/c ratio, i.e., the amount of water provided by CSF slurry addition is sufficiently low to accommodate the additional water in the aggregate, such that a w/c ratio within the range of 0.18 to 0.33 can be achieved.

In preparing the dry concrete mix, the order of addition of the components is not critical. However, the usual process for preparing the concrete is to first mix the cement, aggregates, and other additives, then add the CSF slurry, and, if necessary, any additional water. The aggregates should be analyzed to determine their water content, which is included in the total water content of the concrete.

Methods of preparing aqueous CSF slurries are well known. Generally, these methods simply involve mixing the fine particulate CSF and water with sufficient agitation to provide a homogeneous slurry. Since CSF slurries, and particularly the higher concentration slurries such as those used herein, have a tendency to gel on standing, various stabilizing agents may be added, e.g., as disclosed in Canadian Patent No. 1,220,793 and European Patent Application No. 246,181, published Nov. 19, 1987. If the stabilizing agent also has a plasticizing effect in concrete it should be used minimally in the CSF slurry in order to maintain the desired low slump of the dry concrete mix. Preferably, the slurry contains a stabilizing agent which has little or no plasticizing effect in concrete mixes. Such slurries are disclosed and claimed in the copending U.S. application Ser. No. 07/738,694, now abandoned, filed of even date, which is incorporated by reference herein. These slurries comprise an amino alcohol stabilizing agent of the formula:

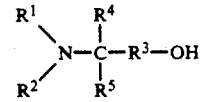

wherein $R^1$ and $R^2$ are each individually hydrogen or a linear or branched alkyl group containing 1 to 6 carbon atoms, e.g., methyl, ethyl, and propyl; $R^3$ is a linear or branched alkylene group containing 1 to 8 carbon atoms e.g., methylene, ethylene, propylene, isopropylene, or isobutylene; and $R^4$ and $R^5$ are each individually hydrogen, a linear or branched alkyl group containing 1 to 8 carbon atoms, or a linear or branched hydroxyalkyl group containing 1 to 8 carbon atoms, e.g., methylol, 2-hydroxyethyl, 3-hydroxypropyl, and 2-hydroxypropyl. If either $R^4$ or $R^5$ is a hydroxyalkyl group, it may be the same as or different than the group $—R^3—OH$.

The amino alcohol stabilizing agents can be used in relatively minimal amounts in the slurry, e.g., 0.01% to 4.0%, preferably 0.05% to 2.0% by weight, based on the weight of silica in the slurry. When introduced into concrete mixes via addition of the stabilized slurry, the amino alcohol has been found to have little or no effect on the fluidity of concrete mixes.

One advantage of the present invention is that the dry mixes can usually be prepared, transported, and dispensed into the dry casting forms using conventional equipment and conditions. Similarly, significant modification of the dry casting methods is not necessary.

The invention is further described in the following Example, which is illustrative only and not of limiting effect.

EXAMPLE 1

A concrete mix of the invention containing 20% by weight of condensed silica fume was prepared by first mixing 1666 lbs. of ⅜ inch gravel, 1765 lbs. of sand, 610 lbs. of Type I/II Portland cement, and 18 oz. of Daratard HC set retarding agent (W. R. Grace & Co.-Conn., Cambridge, Mass.). The gravel and sand were analyzed for water content and contributed 74.8 pounds of water to the mix. To this mix was added 19.5 gallons of a condensed silica fume slurry containing 6.25 lbs./gal. of condensed silica fume solids, 5.55 lbs./gal. of water, and, as a stabilizing agent, 4 oz. per gallon of naphthalene sulfonate formaldehyde condensate polymer (DAXAD-19 of W. R. Grace & Co.-Conn.). The total water in the mix was 183 lbs. (w/c=0.30). The mix was agitated using a paddle blade turbine mixer until a homogeneous paste was obtained. This paste was transferred by conveyor belt to a packerhead casting machine and cast into 48 inch diameter sewer pipe using conventional casting methods. The form was removed about 5 minutes after casting. The cast pipe was self supporting and cured without visible sag or deformation.

A second mix was prepared identically to the first except that the cementitious mix contained 488 lbs. of the Type I/II Portland cement and 122 lbs. of Type C fly ash. This mix was also cast into sewer pipe using the packerhead method, with the same result as was obtained with the first mix.

EXAMPLE 2

A concrete mix of the invention containing 10% by weight of condensed silica fume was prepared by first mixing 1666 lbs. of ⅜ inch gravel, 1765 lbs. of sand, 613 lbs. of Type I Portland cement, and 18 oz. of Daratard HC set retarding agent. To this mix was added 9.8 gallons of a condensed silica fume slurry containing 6.25 lbs./gal. of condensed silica fume solids, 5.55 lbs./gal. of water, and, as a stabilizing agent, 4 oz. per gallon of DAXAD-19. The total water in the mix, contributed by the CSF slurry, residual moisture in the aggregates, and additionally added water, was 183 lbs. (w/c=0.30). The mix was agitated using a paddle blade turbine mixer until a homogeneous paste was obtained. This paste was transferred by conveyor belt to a packerhead casting machine and cast into 48 inch diameter sewer pipe using conventional casting methods. The form was removed about 5 minutes after casting. The cast pipe was self supporting and cured without visible sag or deformation.

A second mix was prepared identically to the first except that the cementitious mix contained 490 lbs. of the Type I Portland cement and 122 lbs. of Type C fly ash. This mix was also cast into sewer pipe using the packerhead method, with the same result as was obtained with the first mix.

EXAMPLE 3

A dry castable concrete composition of the invention was prepared by mixing a Type I Portland cement with fine and coarse aggregate, and an aqueous CSF slurry containing 7.0 pounds of CSF, 4.3 pounds of water, and 4.5 oz. of WRDA-19 per gallon of slurry was added in an amount sufficient to provide a CSF concentration of 20%. This composition was cast into four inch diameter solid cylinders and cured. The permeability of the cylinders was then measured as an indication of chemical resistance, i.e., resistance to erosion and deterioration by chemical attack. The permeability was measured using AASHTO Method T277 which was modified in that the cylinders were eight inches in length, the test was run for five minutes and extrapolated to six hours, and the samples were not vacuum degassed. In accordance with Method T277 a potential of 60 volts was placed across the cylinder samples and current versus time was measured. The resultant curve was integrated to obtain the total charge in coulombs, reported in Table 1. Higher measured charge indicates a higher permeability.

For comparison, concrete compositions containing no CSF and comparable amounts of a dry densified CSF were also prepared and measured for permeability, as also reported in Table 1.

The results of Table 1 indicate that substantially lower permeability is obtained by the addition of CSF slurries to the concrete in comparison to samples prepared with no CSF or dry densified CSF.

TABLE 1

| Concrete Composition | Cement Factor* | w/c** | CSF (Slurry)*** | CSF (Densified)*** | Coulombs |
|---|---|---|---|---|---|
| 1 | 589 | 0.21 | — | — | 2117 |
| 2 | 567 | 0.22 | 20% | — | 259 |
| 3 | 562 | 0.22 | — | 20% | 821 |

*In pounds per cubic yard (pcy) based on weight of Portland cement.
**Based on total weight of water and total weight of Portland cement.
***Percentage of CSF solids in concrete based on dry weight of Portland cement.

What is claimed is:

1. A method for preparing dry concrete mix for use in dry casting methods comprising the steps of:

mixing hydraulic cement, fine aggregate, and coarse aggregate;

adding to the mixture an aqueous slurry of condensed silica fume comprising at least about 5 pounds of condensed silica fume per gallon of slurry, said slurry being added in an amount which provides a condensed silica fume to hydraulic cement weight ratio of about 0.10 to 0.25 and a water to hydraulic cement weight ratio of about 0.18 to 0.33, based on the total amount of water in said concrete mix, to provide a dry concrete mix having a slump of ½ inch or less as measured by ASTM C-143.

2. A method of claim 1 wherein said slurry comprises about 5.0 to 8.0 pounds per gallon of condensed silica fume.

3. A method of claim 1 wherein said slurry comprises at least about 6 pounds per gallon of condensed silica fume.

4. A method of claim 1 wherein said slurry comprises about 6.0 to 7.5 pounds per gallon of condensed silica fume.

5. A method of claim 1 wherein said water to hydraulic cement weight ratio is about 0.22 to 0.30.

6. A method of claim 1 wherein said condensed silica fume to hydraulic cement weight ratio is about 0.15 to 0.22.

7. A method of claim 1 wherein said slurry is a stabilized slurry comprising an amino alcohol of the formula:

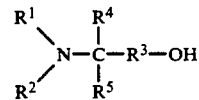

wherein $R^1$ and $R^2$ are each individually hydrogen or a linear or branched alkyl group containing 1 to 6 carbon atoms; $R^3$ is a linear or branched alkylene group containing 1 to 8 carbon atoms; and $R^4$ and $R^5$ are each individually hydrogen, a linear or branched alkyl group containing 1 to 8 carbon atoms, or a linear or branched hydroxyalkyl group containing 1 to 8 carbon atoms.

8. A method of claim 7 wherein said slurry comprises about 0.01 percent to 4.0 percent by weight of said amino alcohol, based on the weight of condensed silica fume in said slurry.

9. A method for preparing a cast concrete structure having improved strength and chemical resistance comprising the steps of:

shaping by a dry casting method, into the form of the structure, a dry concrete mix comprising water, fine aggregate, coarse aggregate, hydraulic cement, and an aqueous slurry of condensed silica fume, wherein the water to hydraulic cement weight ratio is about 0.18 to 0.33 and the condensed silica fume to hydraulic cement weight ratio is about 0.10 to 0.25, said mix having a slump of ½ inch or less as measured by ASTM C-143;

removing the casting form from the cast mix; and permitting the cast mix to cure.

10. A method of claim 9 wherein said water to hydraulic cement weight ratio is about 0.22 to 0.30.

11. A method of claim 9 wherein said condensed silica fume to hydraulic cement weight ratio is about 0.15 to 0.22.

12. A method of claim 9 wherein said slump is zero or less.

13. A method of claim 9 wherein said dry casting method is the packerhead method.

14. A method of claim 9 wherein said dry concrete mix is prepared by mixing said hydraulic cement, coarse aggregate, and fine aggregate and adding to the mixture an aqueous slurry of condensed silica fume comprising at least about 5 pounds of condensed silica fume per gallon of slurry.

15. A method of claim 14 wherein said slurry comprises at least about 6 pounds per gallon of condensed silica fume.

16. A method of claim 14 wherein said slurry comprises about 5.0 to 8.0 pounds per gallon of condensed silica fume.

17. A method of claim 14 wherein said slurry comprises about 6.0 to 7.5 pounds per gallon of condensed silica fume.

18. A method of claim 14 wherein said slurry is a stabilized slurry comprising an amino alcohol of the formula:

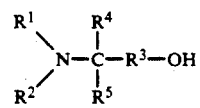

wherein $R^1$ and $R^2$ are each individually hydrogen or a linear or branched alkyl group containing 1 to 6 carbon atoms; $R^3$ is a linear or branched alkylene group containing 1 to 8 carbon atoms; and $R^4$ and $R^5$ are each individually hydrogen, a linear or branched alkyl group containing 1 to 8 carbon atoms, or a linear or branched hydroxyalkyl group containing 1 to 8 carbon atoms.

19. A method of claim 18 wherein said slurry comprises about 0.01 percent to 4.0 percent by weight of said animo alcohol, based on the weight of condensed silica fume in said slurry.

20. A method of claim 9 wherein said structure is a concrete pipe.

21. A concrete mix prepared by the method of claim 1.

* * * * *